UNITED STATES PATENT OFFICE.

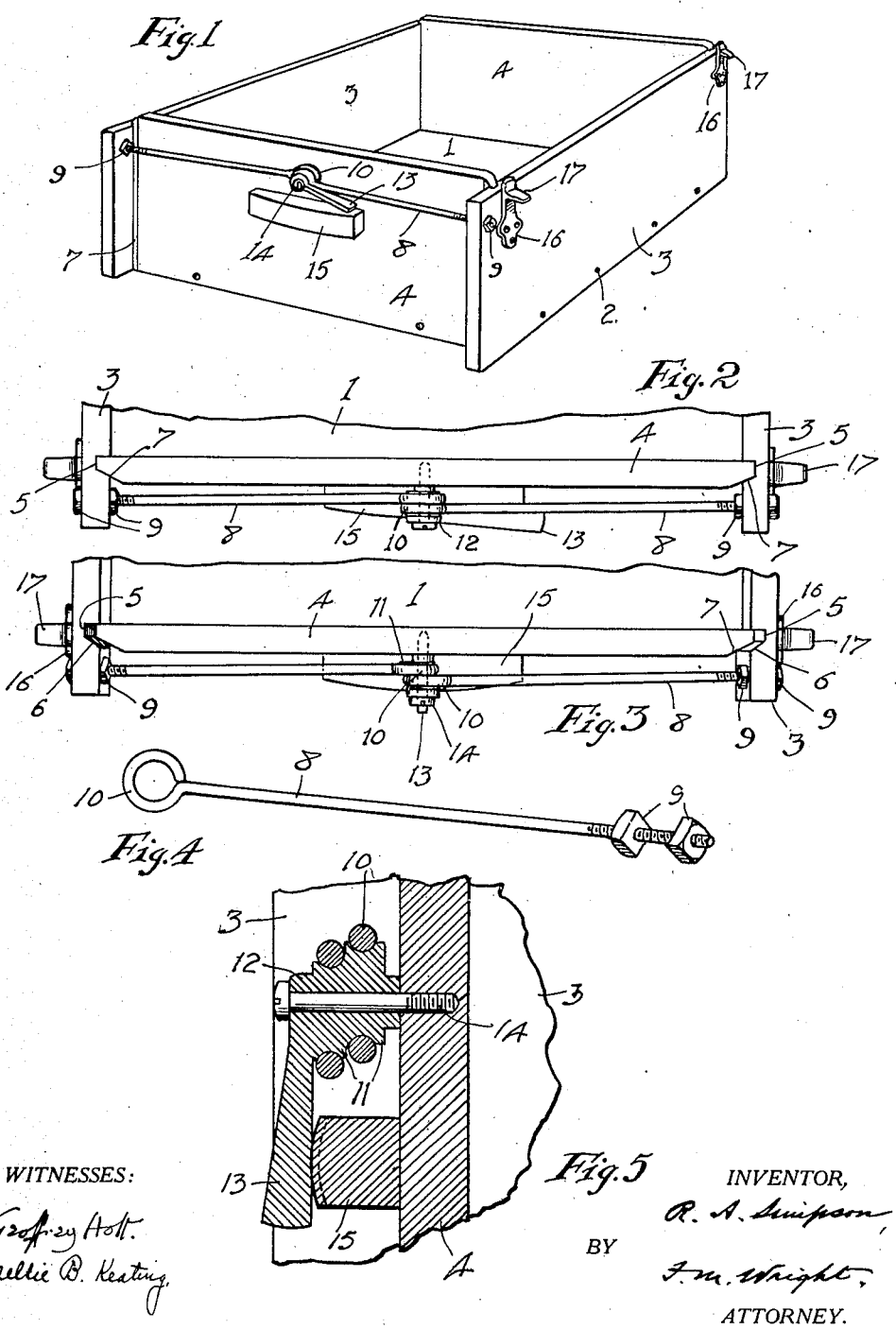

RUFUS A. SIMPSON, OF FERNDALE, CALIFORNIA.

BUTTER-MOLD.

No. 919,478.  Specification of Letters Patent.  Patented April 27, 1909.

Application filed October 10, 1908. Serial No. 457,082.

*To all whom it may concern:*

Be it known that I, RUFUS A. SIMPSON, a citizen of the United States, residing at Ferndale, in the county of Humboldt and State of California, have invented new and useful Improvements in Butter-Molds, of which the following is a specification.

The object of the present invention is to provide a receptacle in the form of a box the sides of which can be readily spread for the purpose of discharging the contents of the receptacle. It is especially adapted for use as a butter mold, but can also be used to advantage for containing any other material which might tend to adhere to the inner surfaces of the sides of the receptacle.

In the accompanying drawing, Figure 1 is a perspective view of the receptacle; Fig. 2 is a broken plan view of one end thereof; Fig. 3 is a similar view, showing the sides and the corresponding end spread apart; Fig. 4 is a perspective view of one of the link rods; Fig. 5 is an enlarged section through a spreader.

Referring to the drawing, 1 indicates the bottom of my improved receptacle, to which are secured, by screws 2, the side boards 3 and the end boards 4. Said screws 2 are not screwed in so tightly as to prevent said sides and ends being able to have a slight movement of their lower edges relatively to the screws. The ends of the end boards are received in vertical grooves 5 formed in the inner surfaces of the side boards, said grooves having their outer sides 6 flaring outward and the outer sides of the end portions of the end boards being correspondingly beveled as shown at 7. The effect of this construction is that, when the side boards are contracted toward each other, the flaring sides 6 of the grooves press upon the beveled portions 7 of the end boards and press them inward. On the contrary, when the side boards are spread from each other, the end boards are free to move outward.

Into the ends of the side boards 3, near the upper edges, and outside the box are screwed from the inside the threaded ends of link rods 8, and nuts 9 are screwed therein up to side boards 3, to provide proper bearing surfaces thereagainst. The inner ends of said rods are formed into loops 10, and the two loops, at each end of the receptacle, respectively surround eccentrics 11 formed to extend in opposite directions on a spreader 12 having a handle 13 and rotating upon a shaft 14 screwed into the end of the box. Below each spreader is secured, upon the end of the box, a cleat 15 which is used as a handle in lifting the box.

The ends of the receptacle extend to a somewhat higher level than the sides, and, on one side only, opposite to, or in the same plane with, the respective ends are secured two lugs 16 which also project slightly above the upper edges of the sides and to substantially the same level with the upper edges of the ends 4, these lugs being formed with finger pieces 17 for convenience of manipulation. The object of this arrangement is to enable the receptacle, when used as a butter mold, and inverted, to be guided into the proper position, the ends of the end boards 4 and the corresponding lugs 16 forming guides which engage the edge of the bottom board and guide the butter mold into the proper position when inverted.

The apparatus is used in the following manner. The butter mold is partly inverted and is placed so that the lugs 16 and the ends of the end boards 4 engage the edge of the bottom board. The butter mold is then wholly inverted. The handles 13 are then turned through substantially one-half of a revolution. In this position the eccentrics have been so turned that the outer ends of the link rods having moved farther apart, thereby causing the side boards to spread from each other. The end boards being now released from the side boards, by reason of the inclined surfaces at the ends of said end boards being no longer compressed by the inclined or flaring sides of the grooves in the side boards, can freely move outward, and exert no pressure upon the ends of the block of butter, so that the butter mold can be readily lifted from said block.

I claim:—

1. A box, open at the top and comprising a bottom, and end and side boards secured thereto, the side boards having grooves to receive the ends of the end boards, and means for spreading the side boards from each other, substantially as described.

2. A box, open at the top and comprising a bottom, and end and side boards secured thereto, the side boards having grooves to receive the ends of the end boards, flaring at their outer sides, and the outer sides of the end portions of the end boards being correspondingly inclined, substantially as described.

3. A box, open at the top and comprising a bottom, and end and side boards secured thereto, the side boards having grooves to receive the ends of the end boards, link rods connected with said side boards and having loops at their inner ends, and eccentrics pivotally supported by the end boards and engaging said loops in pairs, substantially as described.

4. A box, open at the top and comprising a bottom, and end and side boards secured thereto, the side boards having grooves to receive the ends of the end boards, link rods connected with said side boards and having loops at their inner ends, eccentrics pivotally supported by the end boards and engaging said loops in pairs, levers for actuating said eccentrics, and cleats having thickened portions against which said levers move, substantially as described.

5. A receptacle of the character described, comprising end boards, side boards having grooves to receive the ends of the end boards, the end boards extending to a higher level than the side boards, and one side board having secured thereon, opposite to the ends of the end boards, lugs rising above the edge of said side board, to form, with the end boards, guides for guiding the receptacle into position when inverting the same, substantially as described.

In testimony whereof I have hereunto set my hand in the presence of two subscribing witnesses.

RUFUS A. SIMPSON.

Witnesses:
C. F. RANKLIFT,
M. C. DECARLI.